United States Patent [19]

Nordengren

[11] 4,053,407
[45] Oct. 11, 1977

[54] METHOD FOR DISTRIBUTING A SLUDGE TO BE FILTERED OVER THE UPPER SURFACE OF THE FILTER CLOTH OF A ROTATING BELT FILTER

[75] Inventor: Rolf Gunnar Jonas Nordengren, Landskrona, Sweden

[73] Assignee: Nordengren Patenter AB, Landskrona, Sweden

[21] Appl. No.: 720,718

[22] Filed: Sept. 7, 1976

[30] Foreign Application Priority Data

Sept. 5, 1975 Sweden .............................. 7509896

[51] Int. Cl.² ............................................. C02B 1/22
[52] U.S. Cl. ...................... 210/74; 210/400; 210/456
[58] Field of Search ............... 210/73, 74, 84, 305, 210/320, 400, 405, 456, 526; 137/92, 467.5; 162/336, 341, 343; 222/561, 564, 55; 61/28

[56] References Cited

U.S. PATENT DOCUMENTS

| 899,076 | 9/1908 | Ross | 222/561 |
|---|---|---|---|
| 1,534,080 | 4/1925 | Russell | 162/336 |
| 1,904,246 | 4/1933 | Ornstein | 210/74 X |
| 2,371,692 | 3/1945 | Hornbostel | 162/336 |
| 2,919,806 | 1/1960 | Hock et al. | 210/456 X |
| 3,287,918 | 11/1966 | Stewart | 61/28 |
| 3,316,144 | 4/1967 | Knowles | 162/343 |
| 3,729,374 | 4/1973 | Lissalde | 162/343 |

Primary Examiner—Theodore A. Granger
Attorney, Agent, or Firm—Fred Philpitt

[57] ABSTRACT

The present invention is concerned with a method of distributing sludge to be filtered, to the filter surface of an endless-belt filter, so as to maintain a uniform solids content of said sludge. The incoming sludge is in this connection charged to a sludge receiving means in which the sludge is divided into two part-flows such that one of said part-flows contains a higher percentage of solids than the other, whereafter the two part-flows are united and the resultant flow discharged to said filter surface.

1 Claim, 2 Drawing Figures

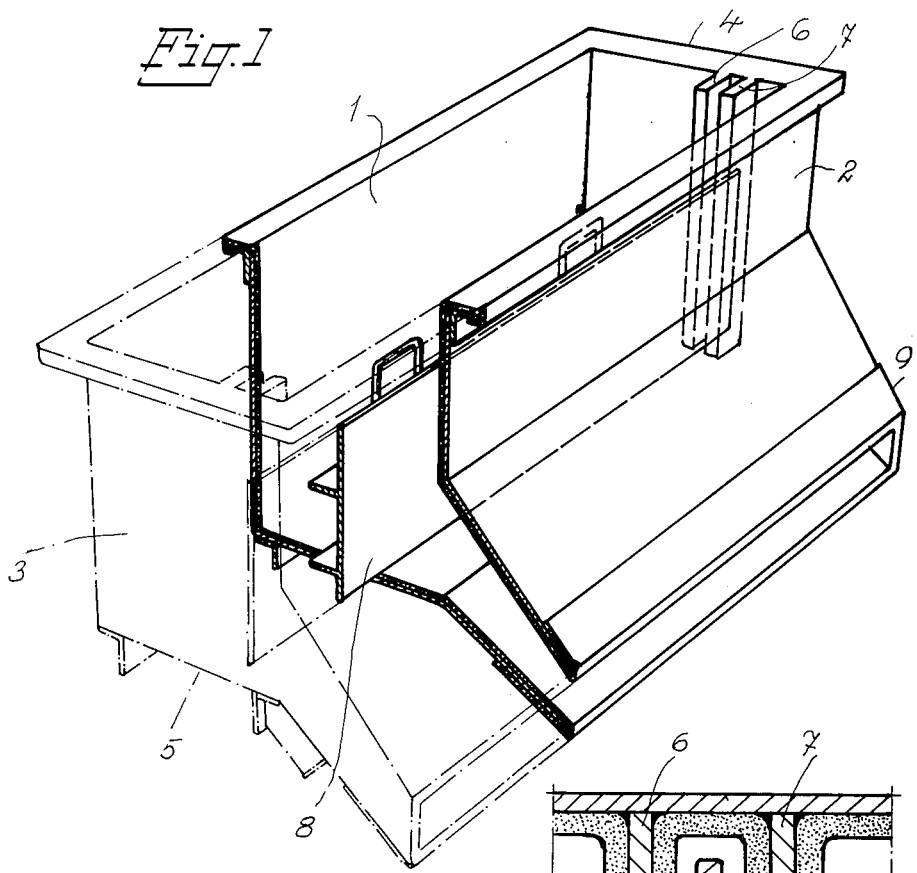

METHOD FOR DISTRIBUTING A SLUDGE TO BE FILTERED OVER THE UPPER SURFACE OF THE FILTER CLOTH OF A ROTATING BELT FILTER

The present invention relates to a method of distributing a sludge to be filtered over the upper surface of the filter cloth of a rotating belt filter.

In heavy industry, it is often required to recover a certain product by filtering operations. An example of such processes is the manufacture of phosphoric acid by reacting minerals rich in phosphorous, such as apatite, with a mineral acid such as sulphuric acid. As a result of this reaction there is obtained a mixture containing calcium sulphate (gypsum) and phosphoric acid. The resultant acid is normally separated from the calcium sulphate formed by means of an endless-belt type filter. Such filters comprise a frame supporting the main components of the assembly, these components comprising a rotatable belt, which is normally made of vulcanised rubber or similar material, and a filter cloth which is arranged to be brought into contact with the belt during a portion of the rotary movement thereof, during which part of said rotary movement the reaction mixture, containing liquid material to be recovered, such as phosphoric acid, is supplied to the upper surface of the filter cloth, the liquid material being caused to pass through openings in the cloth and the solid material being retained on the upper surface thereof.

In order for an endless belt filter to operate satisfactorily, it is important that the solid content of the sludge supplied to the surface of the filter is as constant as possible and that the sludge is distributed over as wide an area of the filter cloth as possible. It has been found difficult to fulfil both of these requirements simultaneously.

The problem is solved in accordance with the invention by charging the sludge to be filtered to a distributor box in which the sludge is held for a predetermined length of time so that the solids in the sludge are able to sink. The distributor box has a spillway in the form of a moveable partition which can be adjusted to form a gap between the lower edge of the partition and the upper surface of the base of the box. As a result of this gap, the flow of sludge from the box is divided into two part-streams, one of which has a relatively low content of solid substance and passes over the upper edge of the partition and the other of which has a relatively high content of solid substance, due to the sinking of the solids, and passes through the gap, whereafter the two part-streams are united and passed, via a nozzle associated with the box, to the upper surface of the filter cloth for transport by the filter belt to a zone of the filter in which the liquid, with the aid of a vacuum, is separated from the solid substance. The gap and the residence time of the sludge in the box are adapted so that the exiting stream of sludge comprising the united part-flows constantly exhibits the same content of solid substance as the sludge initially charged to the distributor box. Owing to the fact that the sludge in the distributor box is constantly moving in the lower portion of the box, depositions of solid material on the walls of the box are greatly avoided, such depositions resulting in interruptions in the filter process for cleaning purposes. In this way devices intended for maintaining the sludge in motion are obviated, such devices requiring energy for the operation thereof.

The invention is characterised by the features disclosed in the characterising clause of claim 1.

An apparatus for distributing sludge to be filtered over a rotary belt-type filter will now be described with reference to the accompanying schematic drawing; in which:

FIG. 1 is an oblique top plan view of an apparatus, such apparatus being partly cut away with the cut-away portion shown in chain lines;

FIG. 2 is a cross-sectional view showing how the partition is arranged to move in a groove.

With reference to FIG. 1, the apparatus comprises a box having two long sides 1, 2 and end walls 3, 4 connecting said long sides. The box is also provided with a base 5. Arranged on the inside of each end wall are two projections 6, 7 defining therebetween a groove. The box is provided with a slidable partition 8 which is arranged to be guided in the grooves formed by the projections 6, 7. The partition 8 has arranged at its upper edge surface a lip by means of which it can be suspended so as to form a gap of desired width or height between its lower edge and the upper surface of the base 5, it being possible to adjust the width of the slot to compensate for the reduction of the solid material content of the sludge as a result of any deposition of said solid content during the residence time of the sludge in the box, by discharging sludge with a higher content of solid material, which passes through the slot. The sludge is discharged through a nozzle 9 connected to the lower portion of one long side of the box and being positioned obliquely thereto and extending towards a filter belt passing therebeneath, said filter belt having a cloth on the upper surface thereof of smaller cross-sectional area than the discharged end.

As clearly shown in FIG. 2, the inside of the box, together with the outwardly projecting ribs can readily be covered with, for example, an acid-resistant material.

What is claimed is:

1. In the known method of filtering a sludge which is composed of calcium sulfate as the solid component and phosphoric acid as the liquid component, which method includes transporting a sludge to a point near an endless belt filter, depositing said sludge on said endless belt filter, and filtering at least a portion of the liquid away from said sludge while it is on said endless belt filter, the improvement which comprises:
   a. introducing said sludge into a sludge receiving zone,
   b. dividing said sludge into two separate streams in said sludge receiving zone so that one of said two separate streams contains a higher percentage of solids than the other of said two separate streams,
   c. uniting said two separate streams so as to obtain a united sludge stream of substantially uniform solids content, and
   d. discharging said united sludge stream on an endless belt filter.

* * * * *